1,639,309

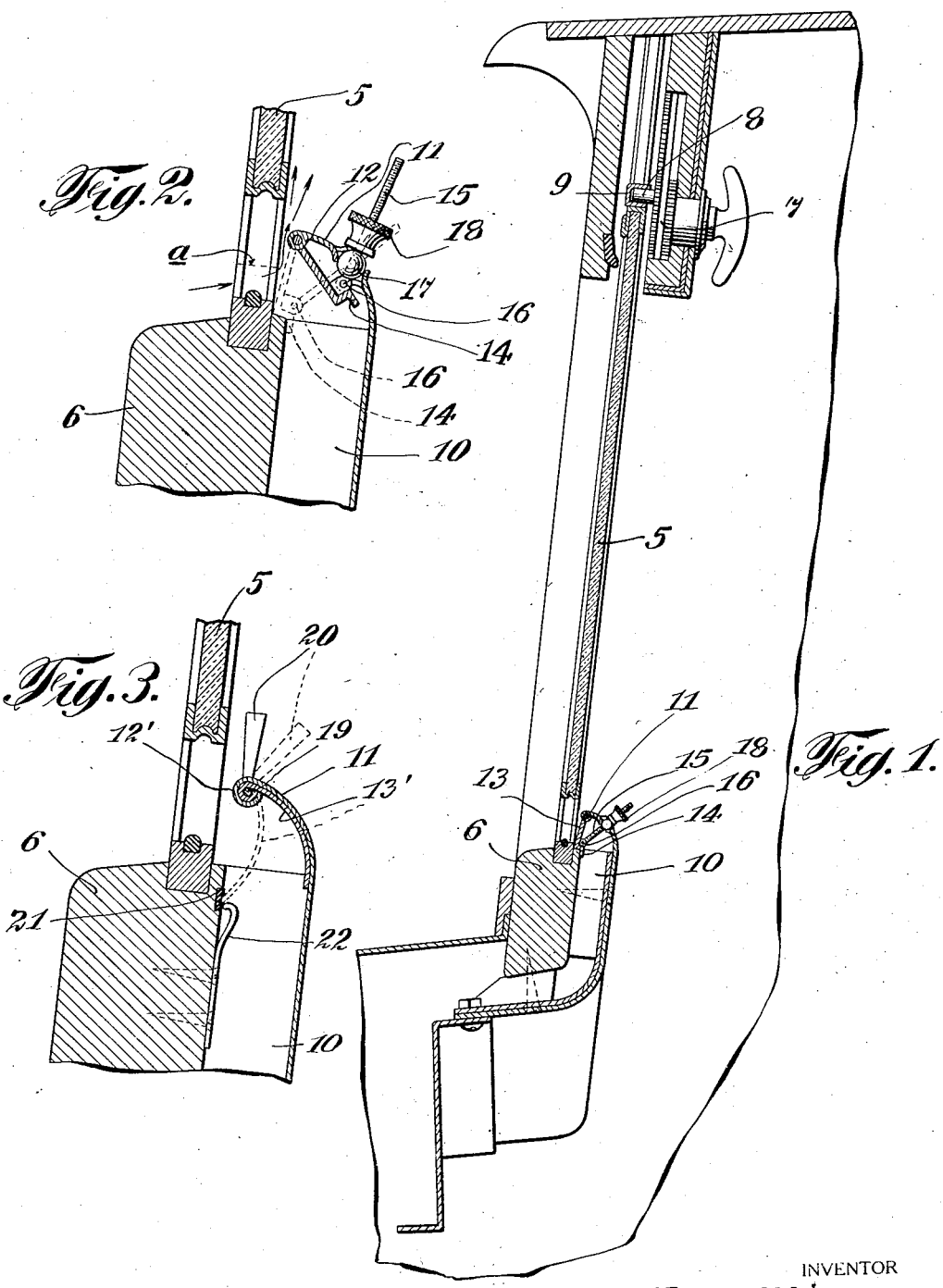
Aug. 16, 1927.
L. OTTINGER
1,639,309
COWL VENTILATOR FOR AUTOMOBILES
Filed July 16, 1926
INVENTOR
Leon Ottinger
BY C. P. Zoepel
his ATTORNEY Patented Aug. 16, 1927.

UNITED STATES PATENT OFFICE.

LEON OTTINGER, OF NEW YORK, N. Y., ASSIGNOR TO EMORY GLENN SIMPSON, OF DETROIT, MICHIGAN.

COWL VENTILATOR FOR AUTOMOBILES.

Application filed July 16, 1926. Serial No. 122,763.

This invention relates to cowl ventilators for automobiles, and more particularly to a device of this kind constructed and arranged for operation in conjunction with the vertically adjustable type of windshield of more or less recent design.

It is the primary object and purpose of my invention to provide means arranged within the upper ingress end of a ventilating passage or channel which is adjustable relatively to the vertically adjustable windshield whereby the flow of ventilating air may be controlled at the will of the operator and caused to pass or flow both horizontally beneath the raised windshield and above the cowl as well as downwardly through said channel or passage beneath the cowl, or to cause the ventilating air to pass either in the horizontal direction under the windshield, or be deflected in a vertically upward direction while preventing the downward passage of air through said channel.

It is also an additional object of the invention to provide an adjustable control means for the ventilating air mounted in the upper end of the air channel or passage which may be easily and quickly operated, is simple in its construction, and not liable to get out of order.

With the above and other objects in view, the invention consists in the improved cowl ventilator for automobiles and in the form, construction and relative arrangement of its several parts as will be hereinafter more fully described, illustrated in the accompanying drawings, and subsequently incorporated in the subjoined claims.

In the drawing, wherein I have disclosed several simple and practical embodiments of the invention, and in which similar reference characters designate corresponding parts throughout the several views,—

Figure 1 is a vertical sectional view through the windshield of an automobile showing my present improvements in one practical embodiment thereof;

Fig. 2 is an enlarged detail vertical section showing the adjustable air inlet control member in its open position, and Fig. 3 is a similar view illustrating a slightly modified form of the device.

Referring in detail to the drawing, and for the present more particularly to Fig. 1 thereof, 5 designates the one piece windshield of a motor vehicle which is mounted in any approved manner for vertical sliding movement in suitable guides provided in a frame suitably mounted between the body walls of the vehicle, said frame being fixed at its lower end in the sill bar 6. The windshield 5 is raised and lowered by a window regulator generally indicated at 7 of conventional form and which as herein shown includes a pin 8 engaged in a channel member 9 fixed to the upper edge of the windshield glass.

The ventilating trough or channel 10 extends entirely across the inner side of the sill bar 6 to which the channel wall is rigidly fixed by any suitable fastening means, the lower end of said ventilating channel extending beneath said sill bar and opening beneath the cowl. At its upper end the wall of the channel 10 is forwardly curved as at 11 above the upper edge of the sill bar 6 and directs the air current downwardly through said channel. As shown in Figs. 1 and 2 of the drawings, the forward edge of this upper end 11 of the channel wall is spaced rearwardly from the windshield and turned inwardly to form a cylindrical hinge sleeve 12 receiving a suitable pintle whereby the adjustable plate 13 is hingedly or pivotally connected at one longitudinal edge thereof with said wall.

The plate 13 extends entirely across the ingress opening to the channel 10 and at its other longitudinal edge is angularly offset as at 14 for bearing contact with the sill bar 6. To this edge of said plate a threaded rod 15 is pivotally connected as at 16 at one of its ends. This rod extends loosely through a suitable guide member 17, which as herein shown is in the form of a ball mounted in the curved upper end section 11 of the channel wall for universal rocking motion. Upon the other end of the rod 15 an adjusting nut 18 is threaded to cooperate with the bearing member 17. If desired, a single rod 15 may be provided centrally of the windshield, or one of these adjusting rods for the plate 13 may be provided adjacent each side edge of the windshield.

From the foregoing description it will be seen that when the plate 13 is in its closed position shown in Fig. 1 of the drawings, said plate is inclined upwardly and rearwardly from the sill 6 and the lower end of the windshield frame. Thus, when the windshield panel 5 is raised to the dotted line position indicated at *a* in Fig. 2 of the drawings, the air will flow beneath the lower edge of said panel and strike the outer surface of the plate 13 by which it will be deflected vertically in an upward direction along the inner side of the windshield panel. Therefore in this position of the panel, there will be no direct horizontal draft of air over the cowl striking directly upon the operator of the vehicle. If such direct horizontal air draft is desired by the operator, the windshield panel 5 is further raised to the position shown in full lines in Fig. 2 where the lower edge of the panel is disposed above the wall 11. If in addition to such horizontal air draft above the cowl, it is desired to direct ventilating air vertically in a downward direction beneath the cowl, then the plate 13 is moved to the open position seen in full lines in Fig. 2 of the drawings by the adjustment of the nut or nuts 18. Thus, it will be apparent that by the proper relative adjustment of the windshield 5 and the control plate 13, adequate and proper ventilation as may be desired by the driver or operator of the vehicle can readily be obtained.

In Fig. 3 of the drawings, I have shown a slightly modified form of the device wherein the air control valve or member is in the form of a curved sheet metal plate 13', one edge of said plate being turned around and rigidly secured to a rod 19 and said edge of the plate being frictionally engaged in the cylindrical tubular forward edge 12' of the wall of the ventilating channel. To one or both ends of the rod 19 a suitable operating handle 20 is fixed.

To the inner face of the sill bar 6 adjacent its upper edge a cushioning strip of rubber or other suitable material indicated at 21 may be conveniently secured and adjacent thereto one or more resiliently yieldable latch plates 22 are secured at one of their ends to the bar 6. The free ends of these latch plates are outwardly curved and opposed to the rubber strip 21. In this construction, it will be noted that when the control plate 13' is in its open position shown in full lines in Fig. 3 of the drawing, it is positioned closely against the inner face of the curved upper end of the trough or channel wall. By operating the handle 20, said plate may be moved to the closed position shown in dotted lines in said figure. As the free edge of the plate approaches the strip 21, it engages the upper ends of the latch plates 22 and springs the same slightly from normal position until said edge of the plate bears closely against said strip. The latch plates 22 then return to normal position and yieldingly confine or hold the edge of the plate 13' against the cushioning strip. Thus, further ingress of ventilating air to the trough or channel will be cut off. In this construction also, it will be observed that the forward edge of the upper end 11 of the trough wall is spaced rearwardly from the windshield frame so that the same upwardly directed flow of the ventilating air above the cowl may be obtained when the plate 13' is in its closed position, as previously explained.

From the foregoing description considered in connection with the accompanying drawing, the construction, manner of use and several advantages of the described embodiments of the invention will be readily understood. It will be appreciated that in either form thereof, the device is exceedingly simple and may be readily applied to motor vehicles of standard construction without necessitating any radical changes therein. While I believe that either of these illustrated constructions is entirely practical for the purpose in view, it will nevertheless be understood that the essential features of the invention might also be embodied in various other alternating constructions, and I accordingly, reserve the privilege of resorting to all such legitimate changes in the form, construction and relative arrangement of the several parts as may be fairly incorporated within the spirit and scope of the invention as claimed.

I claim:

1. In combination with the cowl of a motor vehicle and adjustable windshield panel, means including a manually adjustable member cooperating with the windshield panel in one position thereof to deflect ventilating air entering beneath said panel and direct substantially the entire volume of entering air in an upwardly directed stream closely adjacent to the inner side of the panel, and said member being adjustable to another position with respect to the panel and the cowl to deflect the entering air exclusively in a downwardly directed stream below the cowl.

2. In combination with a vertically adjustable motor vehicle windshield, means arranged at the inner side of the windshield, including a manually adjustable part operating in conjunction with the windshield, whereby in different vertically adjusted positions of the windshield panel, ventilating air may be admitted optionally either only in a horizontal direction beneath the windshield or only in an upwardly directed vertical stream above the cowl of the vehicle or in a downwardly directed vertical stream beneath the cowl.

3. In combination with a vertically adjustable windshield panel of a motor vehicle and a cowl having a vertical ventilating air channel at the inner side thereof having an upper open end opposed to the windshield and in respect to which said windshield is adapted to be adjusted, an adjustable closure plate for said upper open end of the channel hingedly mounted at one of its edges upon the wall of said channel, and manually operable means for moving said plate to open and closed positions whereby the ventilating air may be admitted to the ingress end of said channel or said end of the channel closed when the windshield is raised to admit the ventilating air above the cowl of the vehicle.

4. In combination with a vertically adjustable windshield panel of a motor vehicle and a cowl having a vertical ventilating air channel at the inner side thereof having an upper open end opposed to the windshield and in respect to which said windshield is adapted to be adjusted, an adjustable closure plate for said upper open end of the channel hingedly mounted at one of its edges upon the wall of said channel, and manually operable means mounted in the wall of said channels and pivotally connected with the other edge of said plate to move the latter to its open and closed positions whereby the ventilating air may be admitted to the ingress end of the channel or said end of the channel closed when the windshield is raised to admit the air only above the cowl.

5. In combination with a vertically adjustable motor vehicle windshield and a cowl having a vertical ventilating air channel at the inner side thereof having its upper end opposed to the inner side of the windshield, and manually adjustable means controlling the inlet of air to the upper end of said channel, said means including a pivoted closure plate extending upwardly and inwardly from the windshield sill when in closed position and adapted to deflect the air in an upward stream above the cowl when the windshield is raised to a position with its lower edge below the upper edge of said plate said windshield when raised above the upper edge of said plate admitting the ventilating air in a horizontal stream over the cowl, and said plate when moved to its open position directing the ventilating air downwardly through said channel beneath the cowl.

6. In combination with an adjustable motor vehicle windshield, means arranged at the inner side of the windshield including a manually adjustable member operating in conjunction with the windshield whereby in different adjusted positions of the windshield panel, the ventilating air may be admitted optionally either only in a horizontal direction beneath the windshield or only in a downwardly directed vertical stream beneath the cowl of the vehicle.

7. In combination with the adjustable windshield panel of a motor vehicle, means for directing the flow of air entering beneath the windshield panel including a member arranged so closely adjacent to the inner side of the windshield and extending substantially entirely across the cowl of the motor vehicle and cooperating with the upper edge thereof and extending vertically above the same, whereby in one position of the windshield, ventilating air entering beneath the same is deflected by said member substantially entirely in an upwardly directed stream closely adjacent to the inner face of the windshield and in another adjusted position of the windshield, the ventilating air is admitted above said member substantially in a horizontal direction.

In testimony that I claim the foregoing as my invention, I have signed my name hereto.

LEON OTTINGER.